Oct. 11, 1955   E. I. POLLARD   2,720,600
TWO-POLE ELECTRICAL MACHINE FRAME
Filed Feb. 19, 1952   2 Sheets-Sheet 1

INVENTOR.
ERNEST I. POLLARD
BY
Brown, Aitchison, Flick & Peckham

Oct. 11, 1955     E. I. POLLARD     2,720,600

TWO-POLE ELECTRICAL MACHINE FRAME

Filed Feb. 19, 1952     2 Sheets-Sheet 2

INVENTOR.
ERNEST I. POLLARD
BY
Brown, Critchlow, Flick & Peakham

United States Patent Office 2,720,600
Patented Oct. 11, 1955

2,720,600
TWO-POLE ELECTRICAL MACHINE FRAME

Ernest I. Pollard, Ridgway, Pa., assignor to Elliott Company, Jeannette, Pa., a corporation of Pennsylvania Application February 19, 1952, Serial No. 272,293

2 Claims. (Cl. 310—51)

This invention relates to electrical machinery, and more particularly to the frames of two-pole machines.

The magnetic pull of the field in the air gaps of two-pole electrical machines is such as to tend to distort the core and supporting frame from a circular to an approximately elliptical shape. As the rotor rotates, the magnetic field, and hence the core distortion, rotate with it so that the distortion at any given point around the core may be represented as a radial vibration at that point. In large electrical machines, such as large turbine generators, such vibration of the core is considerable and, if transmitted without diminution to the frame, can cause objectionable vibration of light parts, such as the piping and covers on the generator and associated equipment. These vibrations may be transmitted a considerable distance through the building that houses the generator. Various suggestions have been made to solve this problem. Most of them involve the use of an inner frame supported in different ways by springs from an outer frame, but all of them are complicated and expensive to manufacture.

It is among the objects of this invention to provide a two-pole electrical machine in which core vibration is substantially isolated from the outer part of the frame in a simple and inexpensive manner and without the use of additional elements.

In accordance with this invention, the frame of a two-pole electrical machine is formed from a plurality of spaced parallel plates provided with axially aligned central openings for receiving an electrical core. Means are provided for rigidly connecting the plates together. Each of these plates is provided with a plurality of slots extending around its central opening, thereby forming narrow resilient bars that make the plate flexible radially. This reduces transmission of core vibration radially outward through the plates. The slots may be arranged in concentric rows with the ends of the slots in one row overlapping the ends of the slots in the adjacent row. The slots may be straight, arcuate or some other shape.

Figures 1, 4, 5, 6:
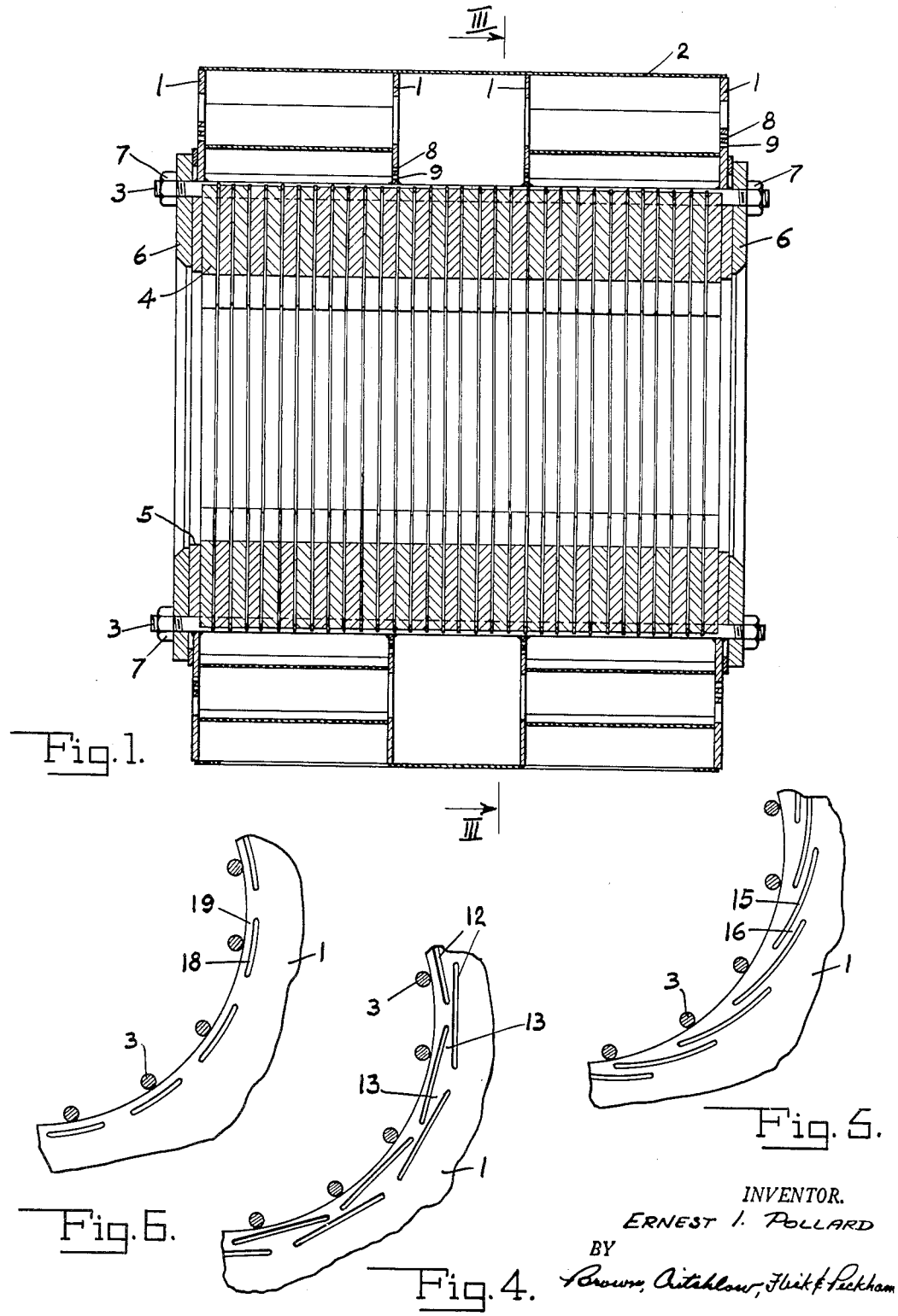
Figure 3:
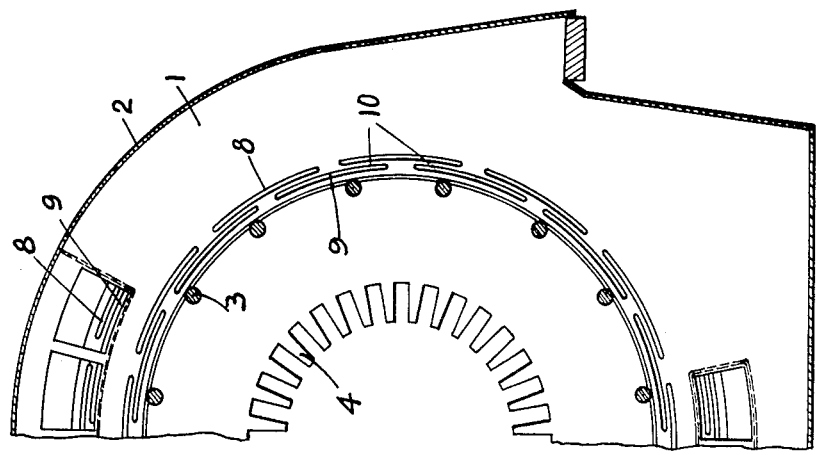
Figure 2:
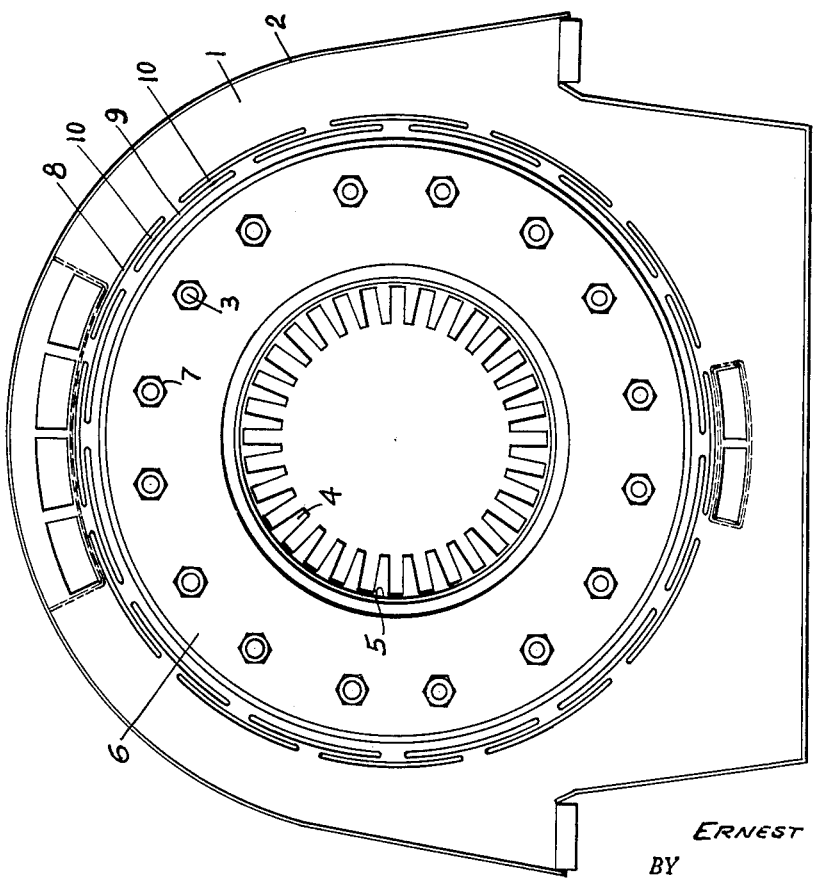

The invention is illustrated in the accompanying drawings, in which Fig. 1 is a vertical section through the frame of a two-pole electrical machine and the core laminations; Fig. 2 is an end view of the machine; Fig. 3 is a fragmentary vertical section taken on the line III—III of Fig. 1; and Figs. 4, 5 and 6 are fragmentary side views of slotted plates incorporating three modifications of this invention.

Referring to the drawings, the frame of the electrical machine is formed from several spaced, parallel, vertical plates 1 that are surrounded by a metal casing 2. The plates are provided with axially aligned central openings, through which parallel studs 3 extend. The studs are welded to the inner edges of the plates and project from the two end plates. They hold all of the plates in position and support the slotted laminations 4 of the core of the machine. The laminations are pressed together by inner and outer end rings 5 and 6 which are held on the threaded ends of the studs by nuts 7. The electrical windings of the core are not shown in the drawings.

It is a feature of this invention that the rotation of the rotor (not shown) within the core does not cause material vibration in the outer portions of the frame plates. This is accomplished by absorbing the core vibrations within the plates themselves before they can reach the outer portions of the plates. Accordingly, each plate is provided with a plurality of slots that extend around its central opening. As shown in Figs. 2 and 3, these slots preferably overlap and are arranged in at least two concentric rows, with the ends of the slots 8 in one row overlapping the ends of the slots 9 in the other row. Also, the slots are curved in arcs parallel to the inner edge of the plate. With this construction, the continuous inner portion of the plate is connected to the outer portion by an intermediate portion which is formed from a plurality of circumferentially extending resilient bars 10. This radially flexible intermediate portion of the plate absorbs most of the vibration transmitted to the inner portion by the core as the rotor rotates. Consequently, no objectionable vibration reaches the outer portions of the plates and the surrounding casing.

The slots can easily be formed by burning them in the plates. For constructional reasons, it is preferred to locate the end plate slots farther from the center of the plates than the slots in the intermediate plates. By proper choice of their number and the spacing between them, the connecting bars or springs 10 can be made resilient enough to transmit less than five per cent of the core vibration to the outer portions of the frame, and yet be strong enough to support the weight of the core and coils and withstand the transient torques generated by a single phase sudden short circuit.

As disclosed in Fig. 4, it is not necessary that the slots 12 be arcuate. They can be some other shape, such as straight, but in such a case the spring bars 13 between them also will take a different shape.

Also, it is not necessary to have concentric rows of slots. Fig. 5 illustrates a frame plate provided with a single row of overlapping slots 15 that will make an annular portion of the plate flexible radially. Here again, narrow resilient bars 16 are formed between the overlapping portions of the slots.

A further modification is shown in Fig. 6, where a frame plate 1 is provided with a single row of arcuate slots 18 extending around the plate close to its central opening, with which the slots are concentric. Each slot is located beside one of the core stacking studs 3, so that there is only a narrow spring bar 19 between the slot and stud. The stud preferably is midway between the ends of the bar.

With the invention disclosed herein, it is unnecessary to add any springs or other devices to the electrical machine frame to absorb vibrations. The vibrations are absorbed by the frame plates themselves. It is not difficult or expensive to slot the plates for this purpose.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A two-pole electrical machine comprising a plurality of spaced parallel frame plates provided with axially aligned central openings, a plurality of studs extending through said openings and secured to the plates in circumferentially spaced relation, core laminations stacked on the studs, clamping rings on the ends of the studs overlapping the frame plates and laminations at the opposite ends of the machine, nuts on the studs forcing said rings toward each other to clamp the laminations in place, each of said plates being provided with a plurality of overlapping slots extending around its central opening to form a plurality of circumferentially extending narrow resilient bars between the overlapping portions of the slots in order to make an annular portion of the plate flexible radially, and said resilient bars being located outside of the circumference of the clamping rings, whereby core vibrations that are transmitted radially outward through the clamping rings to the end plates are reduced as they pass through said radially flexible portions of the end plates.

2. A two-pole electrical machine comprising a plurality of spaced parallel frame plates provided with axially aligned central openings, a plurality of studs extending through said openings and secured to the plates in circumferentially spaced relation, core laminations stacked on the studs, clamping rings on the ends of the studs overlapping the frame plates and laminations at the opposite ends of the machine, nuts on the studs forcing said rings toward each other to clamp the laminations in place, each of said plates being provided with rows of arcuate slots extending around its central opening concentric therewith, the ends of the slots in one row overlapping the ends of the slots in the adjacent row to form a plurality of circumferentially extending arcuate resilient bars in order to make an annular portion of the plate flexible radially, and said resilient bars being located outside of the circumference of the clamping rings, whereby core vibrations that are transmitted radially outward through the clamping rings to the ends plates are reduced as they pass through said radially flexible portions of the end plates.

References Cited in the file of this patent

FOREIGN PATENTS 657,790     Germany _____ Mar. 12, 1938

OTHER REFERENCES

A. I. E. E. Paper 41–39; vol. 60, 1941. "Suppression of Magnetic Vibration and Noise of Two-Pole Turbine Generators."